No. 693,591. Patented Feb. 18, 1902.
G. O. DRAPER.
AUTOMOBILE.
(Application filed Aug. 2, 1901.)
(No Model.)
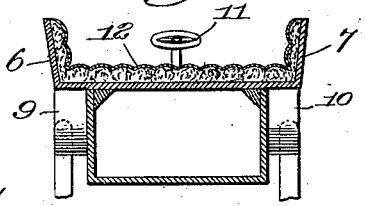
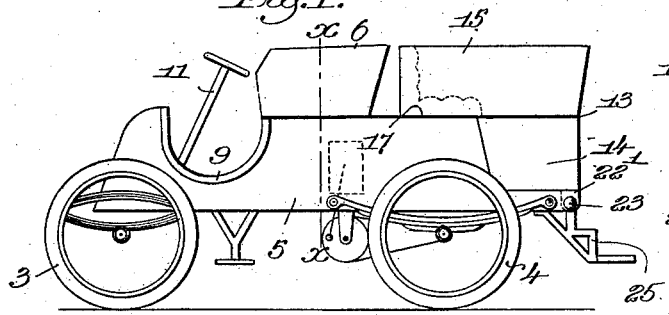
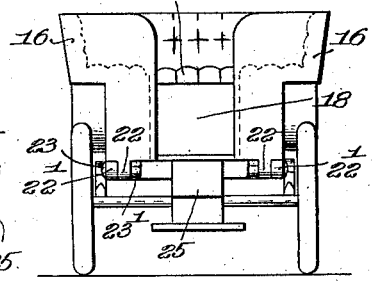
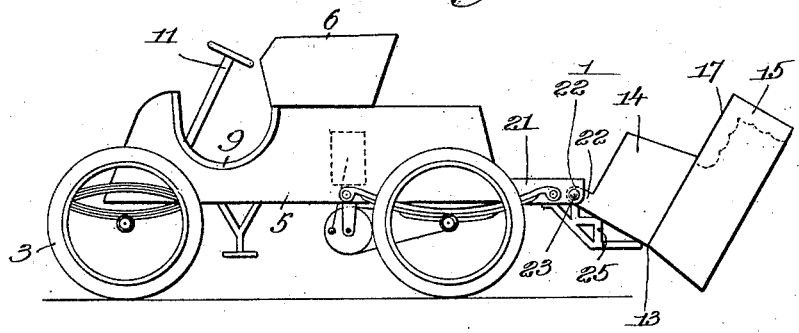
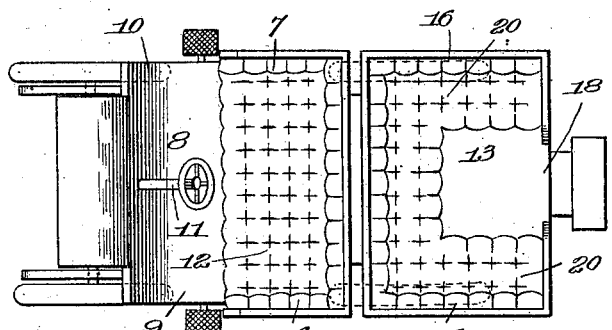
Witnesses:
Adolph H Kaiser
Fred S. Greenhof
Inventor:
George O. Draper
by Crosby Gregory
Attys.
THE NORRIS PETERS CO., PHOTO-LITHO., WASHINGTON, D. C.

UNITED STATES PATENT OFFICE.

GEORGE O. DRAPER, OF HOPEDALE, MASSACHUSETTS.

AUTOMOBILE.

SPECIFICATION forming part of Letters Patent No. 693,591, dated February 18, 1902.

Application filed August 2, 1901. Serial No. 70,609. (No model.)

*To all whom it may concern:*

Be it known that I, GEORGE O. DRAPER, a citizen of the United States, and a resident of Hopedale, in the county of Worcester and State of Massachusetts, have invented an Improvement in Automobiles, of which the following description, in connection with the accompanying drawings, is a specification, like figures on the drawings representing like parts.

One of the defects of the present style of automobile is its lack of carrying capacity.

In the ordinary construction of automobiles the seat is approximately the same width as the body of the vehicle and is only wide enough to comfortably accommodate two persons, so that in a one-seated vehicle only two persons can be carried at the same time. If the body and the seat were widened sufficiently, so that the seat would accommodate three persons, the running-gear would have to be correspondingly widened, and this would make a structure which would be too wide for ordinary use.

One of the objects of this invention is to construct an automobile-body which can be carried by a running-gear of the ordinary width, but which will have a seat thereon capable of accommodating three persons instead of two.

Another object of my invention is to provide the body of an ordinary motor-vehicle with a movable rear compartment having seats therein which can accommodate four or more extra passengers. I accomplish these objects by widening the foot-rest and seat portion of the body of the vehicle, so as to provide the same with extensions or overhanging portions which extend beyond each side of the vehicle-body proper, the foot-rest portions extending over the front wheels and taking the place of the usual mud-guards. It is thus possible to accommodate three persons upon the seat without widening the main portion of the body or the running-gear, and I can place the steering device centrally of the seat, so that the person riding in the center can do the steering. I also preferably connect to the rear of the body of the vehicle in some suitable way a rear compartment, which when in operative position covers the rear portion of the main body, the said rear compartment having overhanging portions which extend out over the rear wheels. Preferably the said rear compartment will be provided with an entrance-way at its rear end and will have seats surrounding the other three sides thereof, the said compartment being of such a size as to accommodate four or more persons. It will thus be seen that without increasing in any way the size of the running-gear or vehicle-body proper I may construct a vehicle capable of carrying seven or more persons instead of two.

Referring to the drawings, Figure 1 shows a side view of my automobile-body, the machinery for driving the same being omitted for the sake of clearness. Fig. 2 shows a rear view of the automobile. Fig. 3 is a side view showing the rear compartment in its inoperative or secondary position. Fig. 4 is a top plan view, and Fig. 5 is a section on the line *x x*, Fig. 1.

The running-gear, comprising the front wheels 3 and the rear wheels 4, and the driving mechanism for driving the same (shown in dotted lines) may be of any suitable or usual construction, and since my invention relates solely to the construction of the automobile-body I have not deemed it necessary to herein illustrate in detail any driving mechanism.

The main portion of the body 5 of the vehicle contains or incloses the engine, motor, or other driving mechanism, as usual, and is supported upon the running-gear in any suitable or usual way, the said body being of the usual width and being contained between the wheels of the running-gear, as usual.

Instead of making the seat portion 12 of the body of substantially the same width as the main portion of the body, in which case the said seat would accommodate only two persons, I widen the seat by extending the same beyond the main portion of the vehicle-body to form overhanging portions 6 and 7, and I also widen the foot-rest 8 of the body and extend the same beyond the body, either side thereof, to form overhanging portions 9 10, the said overhanging portions of the foot-rest extending over the front wheels 3 and serving as mud-guards. With this construction of vehicle-body I may place the steering device 11, which may be of any suitable or usual construction, centrally of the seat portion 12, which is considered a better mechanical arrangement than where the steering apparatus is placed at one side, as is necessary when the seat can accommodate but two persons.

To further increase the carrying capacity of my automobile, I provide the same with a rear compartment 13, which is preferably movable from its operative or primary position (shown in Fig. 1) to its inoperative or secondary position, (shown in Fig. 3,) the said compartment when in its primary position serving to cover the rear portion of the body 5, in which the engine or other driving mechanism is usually placed, whereby when the said compartment is moved into its secondary position the driving mechanism of the automobile is exposed for cleaning or repair.

The rear compartment 13 comprises the base portion 14, which is of substantially the same width as the main portion of the body of the vehicle, the said base portion supporting the seat portion 15, which preferably has a general rectangular shape, the said seat portion extending beyond the base portion 14, on the sides thereof, to form overhanging portions 16 and also beyond the base portion 13, in the front thereof, as at 17, said front overhanging portion 17 resting upon and covering the rear portion of the main body 5, as shown in Fig. 1, when the rear compartment is in its primary position. The said rear compartment is preferably provided at its rear side with an entrance-opening 18, and seats 20 may be arranged around the other three sides thereof, the said seats accommodating four or more persons, according to the size of the compartment.

I will preferably pivot my rear compartment 13 to the main body portion 5, so that the same may be swung from its primary or operative position into its secondary or inoperative position, and, as illustrated in the drawings, the body of the vehicle is provided with a rear extension or platform 21, to the rear of which the rear compartment 13 is pivoted in any usual way, as by pivot-bolts 23, extending through ears 22 on the rear compartment and ears or lugs 22' on the platform 21. The rear compartment may be removed entirely, if desired, by unscrewing the nuts 23' from the bolts 23 and removing the bolts. Any other suitable manner of pivoting the rear compartment to the body may be employed without departing from my invention. When the rear compartment is in its operative or primary position, the base portion 13 thereof will rest upon the platform 21, while the front extension 17 will rest upon the upper portion of the rear of the body 5, as above described. Any suitable locking device (not shown) may be used to lock the rear compartment in its operative position.

Extending from the rear of the platform 21 are any suitable steps 25, by means of which the passengers may ascend to the rear compartment, said steps being braced or supported in any suitable way and operating as a rest or support for the compartment 13 when the same is brought into its inoperative or secondary position, as shown in Fig. 3.

It will be seen that I have devised a novel form of body for an automobile wherein the carrying capacity is greatly increased without making the body proper of any greater size either by lengthening or widening the same, and by virtue of my construction I may entirely omit the usual mud-guards. Furthermore, it will always be possible to perfectly balance the load, for if only one person is occupying the vehicle he will naturally occupy the center of the seat 12, as the steering device 11 is centrally placed, thereby centralizing his weight.

By making the rear compartment detachable the same may be removed, thus converting the automobile into a single-seated vehicle.

Various changes may be made in the structure of the device without departing from the spirit of the invention as expressed in the following claims.

Having fully described my invention, what I claim as new, and desire to secure by Letters Patent, is—

1. In an automobile, running-gear, and a body supported thereon, said body having transversely-extending seat and foot-rest portions which project beyond the main portion of the body on each side thereof and extend over the wheels of the vehicle.

2. A body for an automobile having the seat and foot-rest portions thereof extending transversely of the body and projected beyond the main portion of the body on each side thereof, said projecting portions of the seat and foot-rest being adapted to extend over the wheels.

3. An automobile having a suitable running-gear, a body suitably supported thereon, the seat and foot-rest of the body having overhanging portions extending beyond the body on each side thereof, the overhanging portions of the foot-rest extending over the front wheels and serving as mud-guards.

4. An automobile having a suitable running-gear, a body suitably supported thereon, the seat and foot-rest of the body having overhanging portions extending beyond the body on each side thereof, combined with a steering device located centrally of the seat.

5. In an automobile, a body inclosing driving mechanism, a movable rear compartment extending over said body and provided with an entrance-opening on one side thereof, and having seats on the other sides thereof.

6. In an automobile, a body containing driving mechanism and having a transversely-extending front seat, a movable rear compartment extending over said body and provided with seats, and a rest supporting said compartment in its secondary or inoperative position, said transversely-extending front seat and the rear compartment both being wider than the main portion of the body.

7. In an automobile, a body containing driving mechanism, said body having a front seat extending transversely of the body and overhanging the latter on each side thereof, and a rear compartment hinged to the said body and provided with a seat, said rear compartment being independent from the front seat.

8. An automobile-body having a rear extension, a rear compartment having seats and hinged to said extension, said compartment when in its operative position resting on and covering the rear portion of the body.

9. An automobile-body having a rear extension, steps suitably suspended therefrom, a rear compartment hinged to the extension and in its operative position resting on the top of the body and in its inoperative position resting on the steps, said compartment having a rear entrance-opening and seats on the front and sides thereof.

In testimony whereof I have signed my name to this specification in the presence of two subscribing witnesses.

GEORGE O. DRAPER.

Witnesses:
E. D. BANCROFT,
CHESTER A. WEIR.